June 8, 1965
J. PRYOR
3,188,076
UNIVERSAL LATHE JIG
Filed Nov. 17, 1960
2 Sheets-Sheet 1
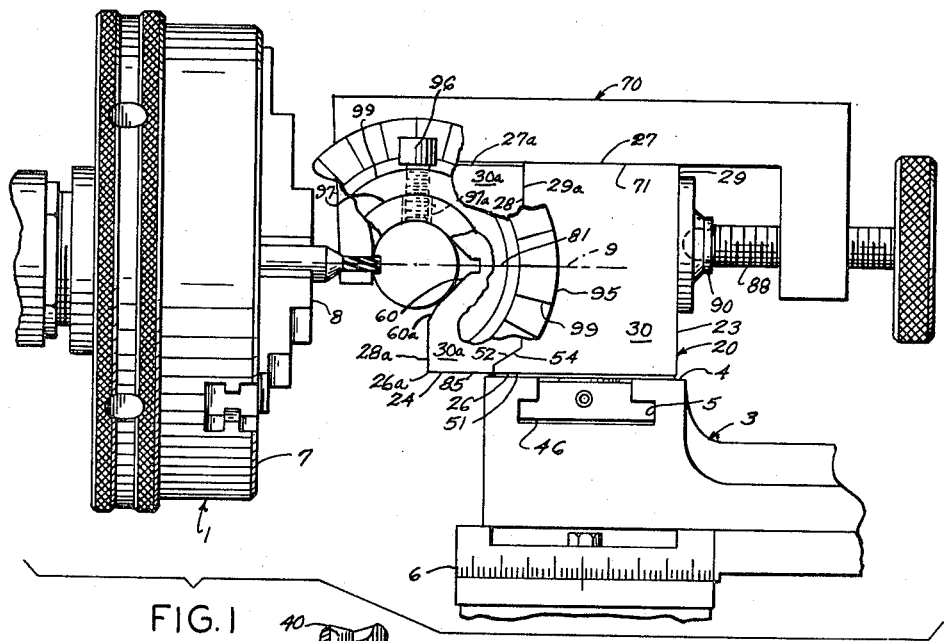
FIG. 1
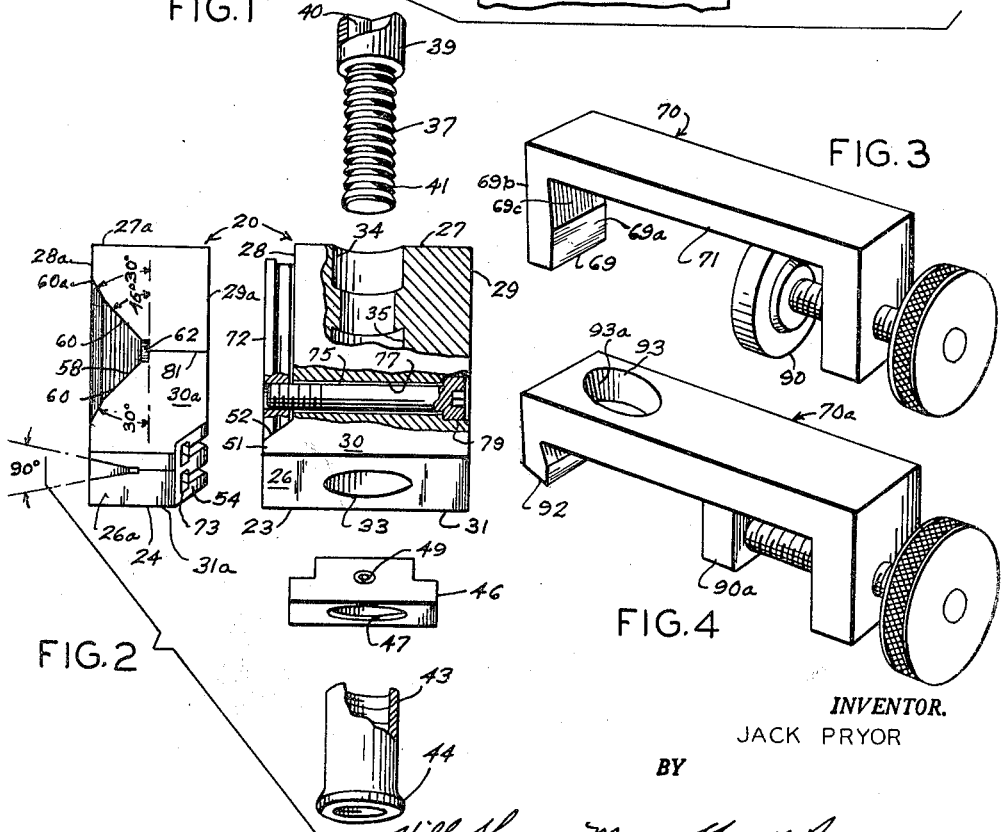
FIG. 2
FIG. 3
FIG. 4
INVENTOR.
JACK PRYOR
BY
Hill, Sherman, Meroni, Gross & Simpson
ATTORNEYS June 8, 1965

J. PRYOR 3,188,076

UNIVERSAL LATHE JIG

Filed Nov. 17, 1960

INVENTOR.
JACK PRYOR

BY
Hill, Sherman, Meroni, Gross & Simpson
ATTORNEYS

United States Patent Office 3,188,076
Patented June 8, 1965

3,188,076
UNIVERSAL LATHE JIG
Jack Pryor, 102 W. Church St., Pocohontas, Ark.
Filed Nov. 17, 1960, Ser. No. 69,949
11 Claims. (Cl. 269—101)

This invention relates to a work or tool locating and holding device for a lathe or the like and more especially to a V-groove, locating and holding jig or fixture adapted to be secured in accurately adjusted position to replace the tool post of a lathe, particularly of the tool room or engine type, and having self-centering V-groove means to always accurately locate the work or tool relative to the axis of the lathe spindle and in a true 90° or parallel relationship thereto for a number of different types of applications, this device including clamp means and other co-operating parts.

In accordance with the basic principles of this invention, a rugged and rigid block unit is provided with adjustable means to clamp and lock it in an aligned position on the compound of a lathe in lieu of the usual tool post with this adjusted alignment being determined by its own flat and mutually perpendicular surfaces and by its self-centering V-groove means. At least one such symmetrical V-groove is provided in the planar and vertical front face of the block unit with its bifurcating plane perpendicular to such face and adjusted to be always exactly parallel to the axis of the lathe spindle and facing or opening in the direction of work-tool pressure to give an inherent or self-centering or locating action as such pressure is applied. This device permits the employment of the normal power, speeds, and the several feeds of such a lathe without impairment. Thus, the clamped work is always held in a true 90° or parallel relationship to the axis of the lathe spindle. Preferably, this V-groove bifurcator is also exactly perpendicular to the accurately vertical front face of such block unit and the unit has a rear face accurately parallel to its front face and to be engaged by a unit embracing clamp to secure work or a tool in the V-groove in which it is always centered into its desired accurate position by feed pressure against said lathe spindle. Also, at least the horizontal bottom face of said unit is accurately perpendicular to said front and rear vertical faces and preferably said block unit is rectangular with all of its six faces at 90° to each other.

In the broader aspects hereof, the V-groove may be either accurately vertical or horizontal which in the preferred form hereof there are two such mutually perpendicular V-grooves which extend horizontally and vertically and completely across the vertical front face with each having its bifurcating plane always accurately parallel to the lathe spindle axis. The horizontally extending V-groove preferably has its bifurcating plane lying exactly on or in the axis of the lathe spindle. The vertical V-groove has its bifurcating plane always accurately parallel to the lathe spindle axis. It may readily be adjusted to lie in such axis by the lathe cross feed adjustment. As hereinafter described in more detail, this device also includes necessary and cooperating features including a suitable adjustable clamp means to rigidly hold it down or lock it in position on the lathe compound with its lower horizontal face matched to the horizontal face of the top of the compound.

Other features include suitable clamp means embracing said block from front to back to hold work or a tool in a selected one of said V-grooves, index lines all around the integral surfaces of said block unit to locate the bifurcating plane of each said V-groove, and a preferably full circle protractor means to be readily and rigidly mounted on the work or the like is provided for use with such index lines for direct indexing. Other portions of the device or its assembly and a more detailed and exact description thereof and of its uses and advantages are provided in a more detailed description of this invention and by the accompanying drawings.

The general objects of this invention are to provide an improved and simplified work or tool locating as well as holding fixture or jig for use on lathes which is of the self-centering V-groove type with superior accuracy and rigidity and the ability to always hold the work or tool in a true 90° of parallel relationship to the axis of the lathe spindle.

Another object hereof is to provide such a V-groove type lathe fixture which has adjustment provisions and means whereby it is of the universal type useful for a wide variety of purposes or set ups without sacrificing its accuracy and rigidity.

Further objects hereof are to provide such a self-centering V-groove type of lathe jig which is simple, and inherently sturdy and rigid as well as being accurate and of low cost in all parts thereof including its own adjustable mounting on the lathe compound, its work or tool holding clamp means, and its indexing means.

Still another object hereof is to provide such a lathe fixture having two such V-grooves in its vertical front face. These two V-grooves being accurately vertical are horizontal and preferably extending across the entire front face of the block unit.

Other and more specific objects hereof are the provision in such a lathe fixture with its V-groove means in its vertical front face of improved and cooperating means including clamp means to hold work in said V-groove, fixture retaining means to adjustably secure it on the lathe compound, a built-in vertical adjustment surface for slidably positioning of the front portion carrying a horizontal such V-groove, index means for each such V-groove, and a work or tool-indexing protractor.

Other and more specific objects, features, and advantages of this invention will be apparent from the following more detailed description taken in conjunction with the accompanying drawings in which like reference characters are used to designate like parts and in which:

FIGURE 1 is a broken away or partial elevation view showing a conventional tool room type lathe with a jig unit and assembly of a first embodiment of this invention installed and in use thereon;

FIGURE 2 is an enlarged and exploded perspective view showing the block unit and its components for the fixture of this same first embodiment with broken away portions to show the internal structure;

FIGURE 3 is a perspective view of the horizontal V-groove work clamp;

FIGURE 4 is a perspective view of the vertical V-groove work clamp;

Figure 5:
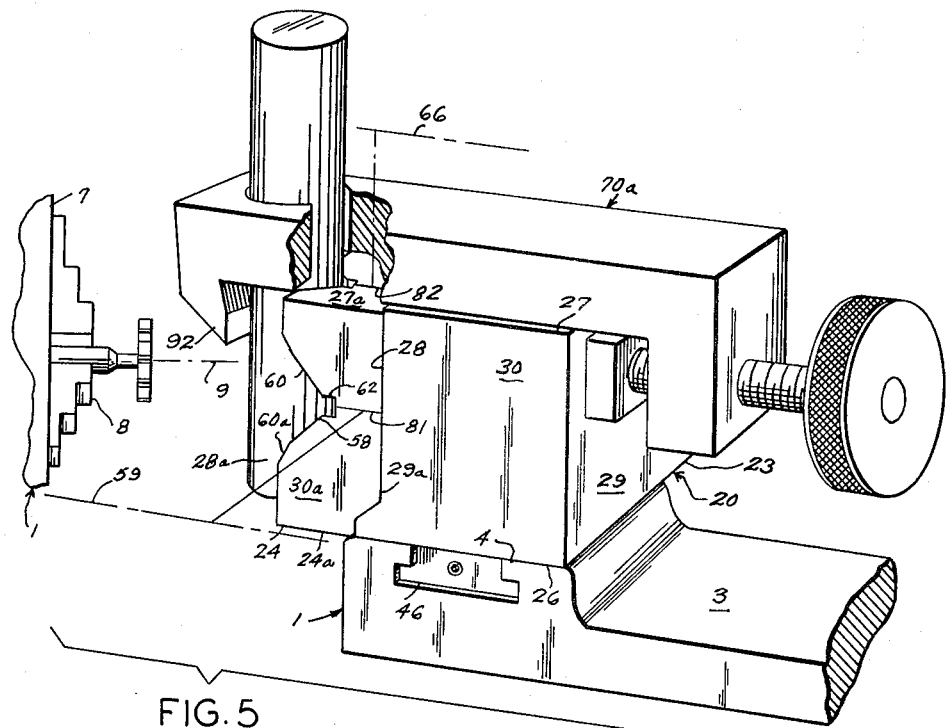
Figure 6:
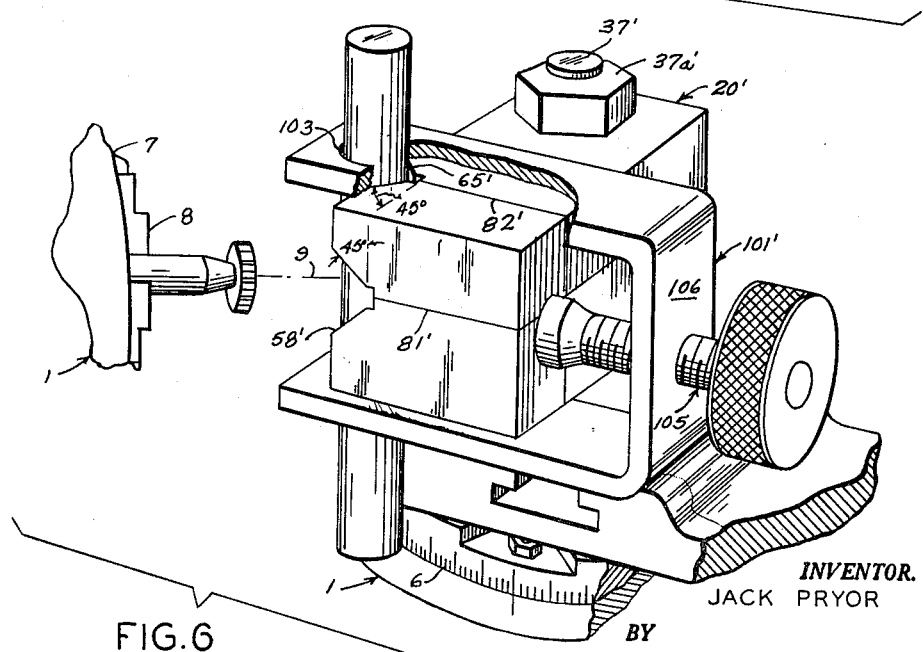

FIGURE 5 is a partial and reduced scale perspective view of the same first embodiment on the same type of lathe with its vertical V-groove and its vertical V-groove clamp in use but with the block unit turned out of its operating position to better show the rear portion thereof; and FIGURE 6 is a reduced scale partial perspective view showing a second embodiment of the jig of my invention turned out of position on the same lathe with its vertical V-groove in use and a different type of work clamp.

Both embodiments of my invention are shown in use on a conventional tool room or engine type lathe designated as a whole by 1 and which of itself forms no part of my invention. This lathe 1 has the usual and well known parts, only certain of which are given reference numerals herein. These include the compound designated as a whole by 3 with its true horizontal upper surface 4 of its tool post holding T slots 5. This lathe 1 also includes the protractor 6 and the usual cross feed micrometer dial for lateral locating as well as the usual compound dial for axial locating or to determine the depth of an axial cut. The lathe's chuck head 7 has the usual chuck jaws 8 and its spindle axis is represented by the dot-dash line 9.

As shown in FIGURES 1, 2 and 5, in the first and preferred embodiment of my invention, the block unit of this invention is designated as a whole by 20 and consists of only two main block parts. These include the main body portion 23 which is adjustably clamped to the lathe compound and the front face and V-groove portion 24 which is vertically adjustable theron. Body portion 23 has the normally horizontal and flat lower or bottom face 26 which preferably extends over its entire bottom area and is accurately parallel to its similar flat or planar top face 27. The front wall 28 of body portion 23 is also flat or true planar and is accurately perpendicular to both its bottom and top faces. It is also parallel to the flat and vertical rear face 29. Preferably this body portion is of rectangular form with its end or side faces 30 and 31 being truly flat or planar and parallel to each other. They are also accurately perpendicular to its front and bottom walls and to its front and rear walls. The slide guide means on the front wall is hereinafter described.

A front face portion 24 has similarly flat or true planar surfaces which are also mutually perpendicular to each other as described for portion 23. Thus, the front face portion 24 has a flat bottom face 26a and the accurately parallel and flat top face 27a. It also has the parallel and flat side or end faces 30a and 31a which are perpendicular to the front and rear surfaces and the top and bottom faces and correspond to the side faces 30 and 31 of the body portion 23. The front face portion 24 also has the flat and parallel front and rear faces 28a and 29a which are perpendicular to the other faces and correspond respectively to the faces 28 and 29 of body portion 23.

A centrally located hold down clamp screw hole with 33 extends vertically through body portion 23 from top to bottom. Both ends of this bore are counterbored as at 34 and 35 for its top and bottom ends respectively.

The hold down or mounting clamp screw 37 is fitted into the correspondingly shaped hole or bore 33. This screw is of the socket head type, as shown, with the socket head being countersunk in 34 to thus provide for a flat and unobstructed top face 27 and to prevent any interference with either of the work holding clamps in use, particularly when they engage the flat top face 27, as is preferred. The enlarged cylindrical head portion of 37 has a non-circular socket type recess 40 therein for engagement by a suitable socket wrench. The depth of the top face counterbore 34 is such that the top of the socket head 39 is flush with or preferably a few thousandths of an inch below, the top face 27 of the body portion 23.

The threaded end 41 of screw 37 engages in corresponding internal threads in a sleeve type nut 43 having the enlarged lower end 44 as shown. This nut 43 is received in the correspondingly shaped lower counterbore 35 with its enlarged portion 44 under and engaging a suitable T block head 46 and extending through its hole or bore 47. Preferably several such T block heads are supplied with the kit of this invention to aid in fitting different lathes. The T block head used properly fits in the tool post holding T slots 5 of the lathe.

The provision of such an elongated sleeve nut 43 is important since it permits a wide range of vertical adjustments for off center work or other purposes by means of a set of operative raising blocks or shims, one of which is shown at 85 of FIGURE 1, with the one length of mounting clamp screw 37. This arrangement also facilitates manufacture of the kit or assembly for this fixture and simplifies the fitting of the fixture to various lathes. The tool mounting T slots, such as 5, of different lathes are not standardized and vary considerably. Thus, in the jig assembly of my invention, the screw 37 and the sleeve nut 43 are standardized and only the T block head 46 need be varied in size for the particular lathe.

Extra fitting blocks of different thicknesses may be provided to fit the different depths and widths of the slots 5 of different lathes. Each such fitting block has a suitable hole therethrough to receive the sleeve 43. They are provided and arranged in graduated sizes to fit various lathes. The T block head 46 has the locking set screw 49 to lock it to the nut 43 to thus prevent turning of nut 43 when said screw 37 is turned.

In unit 20, it will be noted that the entire bottom face 26 plus 26a is longer from front to back than the top face of 27 plus 27a by reason of the extension or nose 51 having the sloped flat upper surface 52 matching, and to engage, the correspondingly sloped flat surface 54 of front portion 24 when it is lowered all the way down. It is desirable that the lower face 26 of the base or mounting block portion 23 can be flush with the lower face 26a of the front face portion 24 when the latter is fully lowered and the sloped flat surfaces 52 and 54 are in tight engagement as shown in FIGURES 1 and 5. This extension is provided for several reasons including the desirability of achieving the maximum of compactness and rigidity and the minimum of overhang and at the same time to provide a maximum bearing area between the bottom faces 26 and 26a and the surface 4 of the lathe. This arrangement also gives a greater vertical depth for the front face of the block unit 20 and adds strength and rigidity.

It is also to be noted that it's very desirable to be able to have elongated work or stock held in the vertical V-groove extending down below the block unit without interference with the lathe compound or its protractor. Thus a limited overhang, as illustrated, is quite desirable.

The front face portion 24 has in its vertical and planar front face the accurately horizontal V-groove 58 having the bifurcating or bisecting plane 59. This horizontal V-groove 58 has the two main surfaces 60 which are accurately at 90° to each other and 45° to the front face 28a. To prevent their coming to an apex, the major surfaces 60 are separated by the rectangular groove 62. It will be noted that adjacent the face 28a, the slope of the walls is changed, as shown by surfaces 60a to provide a greater angle for a short distance in from front face 28a. These outer surfaces 60a are here shown as being at an angle of 120° to each other and thus they are at 30° to the front face 28a. This provides a double V. It will be understood that while the 90° and 120° angles are preferred, yet other suitable angles may be used. This arrangement is important and desirable in locating and holding work of a much greater diameter than can be handled by the 90° V-groove surfaces 60. It is also to be noted that both surfaces 60 and 60a of this horizontal V-groove extend entirely across the front face of the block.

The vertical V-groove 65 in front face 28a has the bifurcator 66 and is exactly perpendicular to V-groove 58. Preferably it is otherwise identical with 58 but is offset as shown to one side of the center of the side to side width of the block unit and its front face 28a. Unit 20 is longer from side 30 to side 31 than its height or width like block 20' in FIGURE 6. Similarly, the vertical groove 65 is offset laterally as is the vertical groove 65' in FIGURE 6. This offset is desirable to provide for adequate clamping area for proper holding of the work or the like. In this vertical V-groove 65, the main surfaces 60 are at 45° to the front face 28a. The double V or 120° extra surfaces may be omitted from this vertical groove. As shown, it extends from top to bottom of front face 28a.

Another desirable feature of this fixture arises from the importance of having the flat work holding jaw or inner surface 69 of the work or tool clamp 70 (for use with the horizontal V-groove), at exactly 90° from the flat surface 71 of the bar on intermediate length portion of this clamp, which preferably rests or engages on the true 90° and flat top face 27 of the main body portion 23. It is to be noted that the same construction is applied to clamp 70a. Thus, it is desired that there be as great an engaging area as possible on the top face 27 of the body 23 and this is here provided.

Further, it is to desirable to keep the top face 27a of the front face portion 27 slightly below the top face 27 of 24 when it is all the way down or nearly so as it will be in most applications. For this purpose the height of portion 24 is slightly less than that of 23 so that its true 90° or horizontal top face 27a lies slightly below the top face 27 when 24 is in its usual or rigid and more accurate fully lowered position. This is exaggerated in FIGURES 1 and 5.

The front, true vertical, 90° surface or wall 28 of body 23 carries the vertical slide guides and clamp means provided by the two T rails 72, each of which has a suitable working fit in the correspondingly shaped slot 73 extending from top to bottom of the matching and inner flat vertical wall 28a of the front portion 24. These T rails provide an adequate range of vertical adjustment, and, together with the large bearing areas of the two vertical and flat matching surfaces 28 and 29a, these T rails provide maximum clamping power and rigidity. It is to be noted that surfaces 28 and 29a are also engaged by the work-tool or feed pressure to prevent any lost motion on the most heavy-duty type of use. Also this rigid and large area joint is the only joint between the V-grooves in the front face and the compound engaging lower face 26.

Each of the T rails 72 have their reduced rear ends drilled and threaded so that they serve as the nuts for the front face adjustment and socket head screws 75 which extend through holes 77 from front to back of body 23. There are two screws 75 symmetrically spaced along each T rail. These unthreaded holes 77 are slightly oversized to permit a small amount of swaying or rocking motion of 24 on 23 to permit an accurate adjustment or fit of 24 before it is tightened up to 23. These holes are also counterbored to match or receive the enlarged socket heads 79 of screw 75. Thus, heads 79 are also slightly below the true vertical and flat rear face 29 to leave it unobstructed for clamp engagement. It will thus be seen that all surfaces of the lock unit 20 are true flat and unobstructed, thus permitting the work or tool holding clamps for the vertical or the horizontal V-grooves to be used anywhere over these faces or surfaces.

As shown, the bifurcating or bisecting planes for the two V-grooves are indicated or carried out by the scribe or index lines 81 for horizontal V-groove 58 and 82 for vertical V-groove 65. For greater accuracy, these index lines are only permanently provided across the top and bottom faces of the front face portion 24 since it may not always be exactly matched up with the relatively movable body portion 23. These index or scribe lines may be suitably temporarily extended or shown over the top and back of main body portion 23 only after the jig is accurately fitted for a particular use. It is important to note that these index lines are thus provided only in metal which is integral with the V-grooves themselves.

It may also be noted that the shims 85 supplied with the kit or entire assembly of this invention are in various suitable thickness as will be well understood by those skilled in this art.

While the same or various other types of work or tool clamps may be used, yet it is preferred to provide as a part of the kit for this jig, a separate or different work clamp for the horizontal V-groove and for the vertical V-groove. Thus, the clamp designated as a whole by 70 in FIGURE 3 is provided for use with the horizontal V-groove. This clamp 70 has the true flat and inner work or tool engaging surface 69a on the inner portion of the tapered end, front leg, or extension 69 which is at a true 90° angle to the inner surface 71 of its intermediate length or bar portion and which normally rests on the top face 27 or in some cases on top face 27a. The rear leg 87 of this clamp has a threaded hole to receive the clamp screw 88 (which moves accurately perpendicular to its inner jaw surface 69) and has the relatively large and narrow hand wheel at its outer end for speed of use and the swivel cap or ball mounted head member 90 at its other and inner end.

As shown in FIGURE 4, the clamp 70a is intended for use with the vertical V-groove 65. It is generally similar to the above described clamp 70 except as noted. Its front leg or extension 92 is shorter. It also has the relatively large hole 93 therethrough as shown to receive elongated work or a tool therethrough so that this clamp can readily span the same. The forward or jaw surface of this opening is tapered so as to accommodate tapered work. The rectangular head member 90a of clamp 70a is also of the ball or swivel type.

These two clamps 70 and 70a are specialized and cooperate with the features of the jig of this invention to provide rigidity, sureness and ease of operation and holding power. They also provide true or 90° locating surfaces and do not interfere with work being cut.

It is to be noted that in any such clamp it is important that its two pressure points (or its front and rear engaging surfaces) be in direct alignment with each other or in a horizontal line and parallel to the lathe spindle axis. If not, there is a tendency for the clamp to crawl and loosen. Now in the case of use of the horizontal V-groove in the two-piece block unit 20, the pressure point on the stationary jaw surface 69 of clamp 70 moves with the vertical adjustment of front portion 24. Accordingly, the amount of this adjustment by the T-rails 72 is limited. Further, by locating the axis of the clamp screw 88 of clamp 70 to be horizontal and to normally (i.e. when surface 71 is against 27) bisect this range of adjustment, the misalignment of the pressure points is minimized and does not give trouble. Thus the vertical location of clamp screw 88 is important. This problem does not arise in clamp 70a wherein the alignment of the pressure points remain instant.

The length of front leg 92 of clamp 70 is also such as to locate the pressure point properly as discussed above and yet not cover or interfer with a work surface being cut. The front surface 69b of front leg 69 is at a suitable small relief angle. The inner surface 69c is also relieved at a smaller angle above 69a. A similar construction of the shorter front leg is used for clamp 70a wherein the hole 93 has its forward wall 93a tapered or with a relief angle which is useful since when a taper is held in the vertical V-groove, the axis of the taper is removed from the vertical and leans in the plane of the bifurcator of the vertical V-groove 65.

Since the entire block unit 20 of this invention (including its two portions 23 and 24) is considerably wider from side to side (as from 30 to 31) than its axial length along the axis of the lathe spindle or its height from top to bottom, the clamps for the horizontal V-groove, or for the vertical V-groove, are preferably or normally used over the top face since this gives a shorter span distance and a more rigid set-up. Also, the clamps preferably engage the top face. Other clamping arrangements may, of course, be used in special cases. As shown in FIGURE 1, the kit for this fixture also preferably includes a full circle protractor 95 which is to be used in conjunction with the index lines 81 and 82 to afford a direct and simple indexing of high accuracy. This protractor is to be mounted directly on elongated work or on an arbor holding the work, by suitable means such as its set screw 96. It is accommodated to various sizes of work by the provision in the kit of a suitable set of internal bushings such as 97. The larger sizes of these bushings all have the same external diameter to fit the protractor, but provide a graduated set of internal diameters for different sizes of stock or the like as will be understood by those skilled in this art. To save space in packaging the kit and for economy in manufacture, it is preferred to provide the bushings of the smaller internal diameters with an external diameter to fit in one of the larger size internal diameter bushings. Thus, bushings with an internal diameter of less than ⅞" have an O.D. of slightly less than 1" to fit in the 1" I.D. bushing, whose O.D. is 1½". Each of these bushings has a suitable transverse opening or hole 97a therethrough to permit the set screw 96 to extend therethrough and engage the arbor, stock or the like.

Preferably, the back surface of this protractor is relieved so that only its outer rim portion bears against the block unit 20. Thus, this surface can act as a stop for locating the work longitudinally. This protractor also embodies the knurled cylindrical portion 98 for convenience in use. Its graduations are located on the beveled outer rim portion 99. It is made as thin as is consistent with ruggedness so that cuts may be made quite close to it without excessive overhang.

It is also to be noted that the kit of complete assembly of this invention includes the above noted arbor, suitable wrenches to fit all of the screws of the sockets of this unit, and shims or raising blocks 85, all displayed and held flat in a suitable case.

It will be apparent that the whole block unit 20 may be made in one piece within the purview of this invention and this may be desirable for certain cases or for rigidity. One form of this is shown in effect in my earlier form illustrated in the second embodiment of FIGURE 6. However, it has been found that the two-piece arrangement constructed as disclosed herein provides substantially or practically all of the ruggedness, rigidity, and hence the accuracy of the one-piece type construction. In addition, the two-piece construction provides an easy-to-use and highly desirable vertical adjustment whereby the bifurcator of the horizontal V-groove can be readily and very accurately adjusted to lie exactly along the axis of the lathe spindle, which is desired for most all uses. It is also to be understood that the set of shims or spacer blocks provided with this fixture kit or assembly will be used as far as possible for this purpose but the additional vertical adjustment gives an easier and more accurate final matching of the bifurcating plane into the spindle axis. This vertical adjustment is also useful for various other purposes as will be apparent to thoe skilled in this art.

Transverse alignment, or the adjustment of the front face 28a of the block unit 20 so that it is exactly perpendicular to the lathe spindle axis is quickly and easily obtained by holding this front face 28a firmly against a suitable face while it is being turned in the lathe and then tightening up the hold-down screw 37 to lock the block unit and its already locked front face in this accurately determined transverse position. The set-up is usable for many types of jobs in which the work or tool is to be held in either the horizontal V-groove or the vertical V-groove. Such jobs include end milling, the cutting of Whitney key slots, the drilling of rows of spaced holes, countersinking, off-center cuts, and many others, as will be apparent to skilled machinists.

For a lower degree of accuracy or for many practical purposes, the front face is merely held against the chuck jaws of the lathe while the hold-down clamping screw 37 is tightened up or locked. For even less accuracy, the protractor markings of the lathe compound may be used.

For work on tapers, the work is held in one of the V-grooves, and against a face plate or against the chuck jaws to adjust the jig before its hold-down screw 37 is tightened up.

As another example, it has been found that the jig of this invention is particularly useful as a drilling jig. It is not limited to use on round stock or round work since the true vertical inner surfaces 69 of the workholding clamp jaw of the clamp 70 for the horizontal V-groove or the corresponding true surface of the clamp 70a for the vertical V-groove, will serve to align flat or square work and hold it accurately perpendicular to the spindle axis in either of the V-grooves. In such drilling uses, layout work is practically eliminated. Holes along a piece of stock are accurately located by means of the cross feed micrometer dial of the lathe and the depth of cut is determined by the compound micrometer dial of the lathe. Centering is automatic and accurate by the herein above described action of the V-groove of this fixture. Off center locations are quickly and accurately had by the use of suitable raising blocks or shims such as 85. Duplicate cuts may be made by using a short piece of stock held by the other workholding clamps 70a for example, as a stop for locating the work longitudinally in the horizontal V-groove 58. Short runs of duplicate pieces may be drilled, reamed, counterbored and threaded with high accuracy before construction of the otherwise needed special jig where such a purpose could be much more than started.

It will also be apparent that this jig assembly is not limited to the use of drills, end mills, and other one-end held cutting tools or work, but can also be used for many different jobs wherein the work or the tool is turned between the centers of the lathe, such as the use of circular cutters mounted on an arbor turning between the lathe centers and acting on work held accurately held parallel to, but offset from, the lathe spindle axis in the horizontal V-groove of this invention with the block appropriately turned 90° from its normal position. In all such cases an accurate adjustment is essential.

To obtain such an adjustment, the following procedure may be used. To very accurately adjust or fit the jig of this invention to a lathe for cylindrical or elongated work which is to be held in the axis of the lathe spindle or parallel thereto, the most accurate type of adjustment is made directly to the spindle axis to the lathe. Thus, a suitable arbor (which forms a part of the kit or assembly supplied with the jig of this invention) having true surfaces and centers is centered and mounted between the lathe centers. The block unit 20 is mounted in approximate position with its horizontal V-groove 58 extending approximately parallel to the spindle axis and along this arbor. The two vertical adjustment clamping screws 75 are loosened to permit the V-groove or front face portion 24 of the block unit 20 to slide vertically relative to the main body portion 23 on the slide guides or T rails 72 and also to swing sufficiently longitudinally to permit the surfaces of the horizontal V-groove 58 to align themselves exactly with the surfaces of the arbor. This is done after the height has been accurately adjusted.

Then the mounting or hold-down clamp screw 37 is snugged down sufficiently to assure contact between the bottom face 26 and the block unit 20 and the tool post mounting surface 4 of the lathe compound and yet free enough to permit turning about this hold down screw axis so that the block unit 20 can align itself parallel with the arbor.

The cross-feed of the lathe is then run in so that the surfaces of the V-groove tightly and accurately engage the arbor. The work holding clamp 70 is then applied and tightened to hold this V-groove in tight engagement with the arbor. The hold-down or mounting screw 37 is then tightened as are all four of the adjustment clamp screws 75.

In this case it will be seen that the fixture is simply and quickly adjusted to match the elongated work or arbor which is held in the spindle axis of the lathe.

For a lower degree of accuracy which is practical in many cases, the side or end face 30 of the block unit 20 may be simply held against the face plate or chuck jaws of the lathe to adjust for this type of set-up. While the protractor markings of the compound are also available for setting angles, including the above set-up along the spindle axis, yet this last gives only an approximate accuracy.

The second and earlier form of the jig block unit of this invention is shown installed on a lathe in FIGURE 6. In this second embodiment, the entire block unit is designated as a whole by 20' and is in one piece which provides a unit of lower cost, slightly greater rigidity, but having a less universal use or range of adjustments. It will be apparent that shims such as 85 are required to position its horizontally extending V-groove 58' so that its bifurcating plane lies in the axis of the lathe spindle. Obviously, this cannot be done as closely or accurately as is possible in my first embodiment.

Since most of the true 90° and parallel relationship of the flat faces and other features of this second form are the same or similar as those described above for the first embodiment, they will not be again described in detail or designated by reference numerals. Only certain of the major differences between these two embodiments are described below. Lathe 1 of FIGURE 6 is considered as being the same as that of FIGURES 1 and 5.

In FIGURE 6, the horizontal V-groove 58' does not have the double V arrangement of groove 58 of the first embodiment. The vertical V-groove 65' is also offset as shown for clamping room as in the first embodiment. In this second embodiment, the hold down clamping screw 37' is again centrally located but here projects up above the top face to receive the clamp tightening nut 37a'.

In this second embodiment, it is to be noted that the scribe or index lines 81' and 82', for the horizontal and the vertical V-grooves respectively, may advantageously extend all the way around this one piece or integral block and thus are shown on all four faces of the block unit 20 for each of these two different V-grooves. This gives a higher degree of accuracy and ease of use in indexing.

In FIGURE 6, a different type of clamp, designated as a whole by 101' is shown in use for the vertical V-groove. This generally U-shaped clamp has holes 103 adjacent each free end of its legs to receive a tool or elongated work strut therethrough and to give a balanced and stronger clamp grip action to two spaced apart points on either side of or above or below the unit 20'. The screw unit 105 is suitably threaded in the bight portion 106 and has portions similar to those described above for screw 88. It will be apparent to those skilled in this art that a clamp unit such as 101 or other types of clamps may be employed if desired with the block unit 20 of my first embodiment, and that the application illustrated in FIGURE 6 may be readily set up with the unit 20 of the first embodiment.

It is believed to be unnecessary to list or describe all of the numerous different uses, applications or set-ups that have been achieved by the jig of this invention and its related parts, since it is felt that they, and the universal nature of this fixture, will be apparent to skilled machinists without further elaboration.

While I have only illustrated and described certain specific forms of this invention, yet it will be apparent to those skilled in this art that there are numerous and various other possible changes or modifications in the structure arrangements, and the like and also other uses or applications than those mentioned herein, all of which may be used in the practice of this invention without departing from its principles and teachings and all of which are intended to be embraced within the appended claims, limited only by the spirit and scope of this invention.

I claim as my invention:

1. A lathe supplementing block-like fixture for locating and clamping a workpiece on a lathe when installed and located thereon by being clamped down in the hold-down engaging slot means extending across an upwardly facing horizontal surface of the lathe, which surface is always accurately parallel to the axis of rotation of the lathe's tool-carrying, rotary spindle, said fixture comprising, a block-like main body portion having a flat bottom face unobstructed by protuberances throughout its area with upright hold-down clamp bolt means extending downwardly therefrom and vertically through said main body portion to be engaged in the lathe's engaging slot means to locate said bottom face always accurately parallel to the lathe's upwardly facing surface and thus to the axis of the lathe's spindle, said main body portion having an upright flat front face accurately perpendicular to the lathe's upwardly facing surface and also unobstructed by protuberances throughout its area and a separate, narrower from front-to-rear, upright front body portion having a substantially unobstructed upright flat front face and an accurately parallel, upright rearmost face unobstructed by protuberances and vertically and slidably engaging said front face of said main body portion and connected thereto by a plurality of final adjustment-providing vertical slide guide track means and manual clamp means, said front face of said main body portion being interconnected through to said bottom face of said main body portion by solid metal and through said slidably engaging faces to always hold the plane of said front face of said front body portion perpendicular to the plane of said bottom face by rigid block-like solid portions which are substantially as high as said main body portion throughout a substantial part of the front to rear dimension of said bottom face, at least one V-groove to rigidly hold a workpiece pressed into and centered therein by a front to rear workpiece clamp and to always accurately locate the workpiece relative to the axis of rotation of the lathe spindle, said V-groove extending across and opening forwardly from said front body face of said front portion with its bisecting plane always accurately perpendicular to said front face of said front body portion and to be usually held located parallel to the axis of rotation of the lathe spindle, said main body portion having an upright rearwardly facing, flat workpiece clamp-engaging surface unobstructed by protuberances and located directly to the rear of said front body face of said front portion, being always parallel thereto, and extending along the bisecting plane of said V-groove.

2. The fixture of claim 1 in which said rearwardly facing, workpiece clamp-engaging surface is a rearmost face area integral and extending throughout the height of said main body portion and horizontally and solidly interconnected through to said front face of said front body portion throughout substantially the height of said front face of said main body portion by rigid block-like solid portions of said fixture to carry the horizontal front-to-rear compression from the workpiece clamp with a minimum of error causing deflections, said upright hold-down clamp bolt means comprises only a single bolt means located generally centrally of said main body portion and having means at its lower end to slidably and clampingly engage in the single T-slot extending from side to side across the upper surface of the compound of a lathe, said single bolt means when loosened permitting angular adjustment of said fixture independently of the alignment of the T-slot of the lathe, and said front body portion is of lesser height than said main body portion and does not extend down as far as the locating bottom face thereof.

3. The fixture of claim 1 in which said V-groove extends horizontally with its bisecting plane always parallel to said bottom face and said fixture has fitting means whereby it may be initially fitted to and thereafter removably located on said lathe with said bisecting plane always containing the axis of rotation of the lathe spindle to permit removal and reinstallation on the same lathe without refitting, said fitting means acting to adjust the vertical position of said bisecting plane to be coincident with the lathe's axis of spindle rotation and including shims secured as lower parts of said main body portion and also said vertical slide guide track means to provide a final vertical adjustment.

4. The lathe supplementing fixture of claim 1 in which said V-groove extends vertically and may be located to contain the axis of rotation of the lathe spindle.

5. The lathe supplementing fixture of claim 1 in which said V-groove has an inner included angle portion of substantially 90 degrees and an outer included angle portion of substantially 120 degrees.

6. A lathe supplementing fixture device for installation on a horizontal upwardly facing surface of a laterally adjustable and work carrying member of a lathe, said lathe surface having hold-down track means extending thereacross from side to side and being always accurately parallel to the axis of rotation of the lathe rotary tool carrying spindle, said fixture device including a fixture block which is as a whole generally the shape of a rectangular parallelepiped and comprising a block-like main body portion having a locating flat bottom face and a parallel flat top face, both being unobstructed by protuberances throughout their areas and both extending the front-to-rear depth of said main body portion from an upright flat unobstructed front face which is perpendicular to its said bottom face back to a rearmost flat end unobstructed workpiece clamp engaging face which is parallel to said front face and also perpendicular to said bottom face, said main body portion having a hold-down clamp bolt extending down therethrough countersunk below said top face and down through said bottom face for hold-down clamping engagement in the track means of said lathe to locate said bottom face always accurately parallel to the lathe's axis of spindle rotation and an upright front body portion materially narrower from front to rear than said main body portion and of lesser height than said main body portion so as not to project above or below the top and bottom faces thereof during the final vertical adjustment of said front body portion and having parallel flat and unobstructed front and rear faces whose planes are perpendicular to the plane of said locating bottom face, said front face of said front body portion being vertically adjustable and yet rigidly interconnected through to said locating bottom face of said main body portion and to its said rear face by solid and interengaging portions of said fixture block including a vertically slidable adjustment providing engagement between said front face of said main body portion and said rear face of said upright front body portion, said slidably engaging faces including interlocking means and spaced apart, vertical slide guide means to always hold said front body portion against tilting on said main body portion, said front face of said front body portion having at least one workpiece-locating and holding V-groove extending horizontally thereacross and opening forwardly therefrom with its bisecting plane accurately located by said front face of said front body portion to lie in the axis of the lathe's spindle, and an elongated C-type clamp with a front workpiece engaging surface and a rear surface to squarely engage the rearmost surface of said main body portion to align said clamp, embracing over said fixture block from front to rear and having a flat under surface parallel to its length and perpendicular to both its workpiece engaging surface and its rear surface, its said under surface engaging said flat top face to additionally locate said elongated clamp and hold it and the direction of its clamping pressure always accurately parallel to the locating plane of said bottom face of said main body portion and to the axis of the lathe's spindle.

7. The fixture device of claim 6 in which at least one of said V-grooves is vertical and said workpiece clamp for use with said vertical V-groove has a workpiece receiving opening through its front end and a workpiece clamping surface below said opening and horizontally aligned with a movable rear surface of said workpiece clamp.

8. The fixture device of claim 6 in which said workpiece clamp for use with said horizontal V-groove has a downwardly extending front leg with a vertical workpiece engaging surface at its lower end extending below said bisecting plane of said horizontal V-groove and a movable rear clamping surface horizontally aligned with said workpiece engaging surface to maintain the line of workpiece clamping pressure from said workpiece clamp substantially in the bisecting plane of said horizontal V-groove.

9. The fixture device of claim 6 including in combination a protractor means to be mounted on an elongated workpiece clamped in said V-groove.

10. A lathe supplementing fixture block of generally rectangular parallelepiped shape for installation in lieu of the usual lathe tool post and by engagement of its hold-down clamp means into the track extending across the upwardly facing surface of the compound of a slide rest type of lathe, which surface is always accurately parallel to the axis of rotation of the lathe's rotary tool carrying spindle, said fixture block comprising a block-like main body portion having a fixture block locating, flat bottom face and a workpiece clamp engaging and locating, parallel flat top face, both unobstructed by protuberances and extending substantially from a workpiece clamp engaging and pressure carrying rearmost unobstructed flat face, forwardly to an unobstructed flat and parallel front face, both said front and rear faces being perpendicular to said locating bottom face, said main body portion having only a single, generally central, upright hold-down clamp bolt means extending from a head countersunk below its top face down through its bottom face clampingly engaged in the lathe compound, and an upright front body portion materially shorter from front to rear and of lesser height than said main body portion and having parallel flat and unobstructed front and rearmost faces, said front body portion being vertically, slidably and finally adjustable on said main body portion by engagement of said rearmost face of said front body portion with said front face of said main body portion, said slidably engaging faces having a pair of cooperating laterally spaced vertical slide means and clamp means acting therebetween to locate and hold said front body portion against tilting and the plane of said front face of said front body portion always accurately perpendicular to the plane of said locating bottom face of said main body portion for all of the final vertical adjustments of said front body portion, said front face of said front body portion having a forwardly opening V-groove extending horizontally thereacross with its bisecting plane held always located coincident with the axis of rotation of the lathe spindle by said slide guide means and by the hold-down clamping of said bottom face parallel to the upwardly facing surface of the lathe compound in the fitting of said fixture block to a particular lathe, said V-groove locating a workpiece to be clamped therein.

11. The fixture block of claim 10 which has only two main block body portions with said main portion including, and having its down-down clamp bolt means extending down through, shims with parallel faces held as rigid lower parts thereof to approximately adjust the height of the bisecting plane of said horizontal V-groove to be coincident with the axis of spindle rotation in the fitting of said fixture block to a particular lathe and to retain said fitting adjustment together with the cooperating final vertical adjustment given by said slide clamp means upon removal of said fixture block from said lathe.

References Cited by the Examiner
UNITED STATES PATENTS

| | | | |
|---|---|---|---|
| 884,772 | 4/08 | Sorenson | 90—59.6 |
| 1,071,289 | 8/13 | Bader | 90—59.7 |
| 1,299,759 | 4/19 | Neff | 90—59.62 |
| 1,318,688 | 10/19 | Paschall | 90—59.62 |
| 2,103,074 | 12/37 | Gardner | 90—59.7 |
| 2,315,433 | 3/43 | Kulla | 90—60 |
| 2,369,425 | 2/45 | Becker | 269—87 |
| 2,409,936 | 10/46 | Hunt | 90—59.6 |
| 2,471,361 | 5/49 | Trefz | 90—59.7 |
| 2,556,131 | 6/51 | Wolfson. | |
| 2,671,366 | 3/54 | Beusch | 90—59.61 |

OTHER REFERENCES

American Machinist article, page 136 of issue, April 10, 1947.

ROBERT C. RIORDON, *Primary Examiner.*

THOMAS E. BEALL, THOMAS J. HICKEY,
*Examiners.*